US011730984B2

(12) United States Patent
Huseth et al.

(10) Patent No.: US 11,730,984 B2
(45) **Date of Patent: *Aug. 22, 2023**

(54) WEIGHT BEARING FALL PROTECTION CONNECTOR HAVING A WIRELESS FALL INDICATOR

(71) Applicant: Honeywell International Inc., Charlotte, NC (US)

(72) Inventors: Steve Huseth, Plymouth, MN (US); Bradley Rohlf, Lakeville, MN (US); Michael Fegley, Maple Grove, MN (US); Steven Joseph Sharp, Pleasantville, PA (US); Cinnamon C. Deets, Cooperstown, PA (US); William A. Zachar, Jr., Franklin, PA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/076,486

(22) Filed: Oct. 21, 2020

(65) Prior Publication Data

US 2021/0031062 A1 Feb. 4, 2021

Related U.S. Application Data

(63) Continuation of application No. 16/093,729, filed as application No. PCT/US2016/027429 on Apr. 14, 2016, now Pat. No. 10,843,016.

(51) Int. Cl.
*A62B 35/00* (2006.01)
*F16B 45/02* (2006.01)

(52) U.S. Cl.
CPC .......... *A62B 35/0037* (2013.01); *F16B 45/02* (2013.01)

(58) Field of Classification Search
CPC ............................ A62B 35/0037; F16B 45/02
See application file for complete search history.

(56) References Cited

U.S. PATENT DOCUMENTS 4,660,679 A 4/1987 Ostrobrod
5,220,977 A 6/1993 Wolner
(Continued)

FOREIGN PATENT DOCUMENTS

AU 2006207863 A1 9/2007
CN 102039014 A 5/2011
(Continued)

OTHER PUBLICATIONS

Office Action issued in Chinese Application No. 201680086797.9 dated Dec. 9, 2020, 7 pages.
(Continued)

*Primary Examiner* — Robert Sandy
*Assistant Examiner* — Rowland Do
(74) *Attorney, Agent, or Firm* — Alston & Bird LLP

(57) ABSTRACT

A weight bearing fall protection connector includes a first connection member configured to attach the connector to a piece of fall protection equipment, and a second connection member configured to attach the connector to another piece of all equipment, with the connection members fixed to each other to transfer the weight of a worker in a fall event and for movement relative to each other between a ready position and a fall position. The connector further includes a breakable component having a retaining condition wherein the component maintains the members in a ready position and broken condition wherein the component allows the members to move to their fall position. The connector further includes a wireless fall indicator including a wireless transmitter and a switch configured to activate the wireless (Continued)

transmitter in response to movement of the members from the ready position to the fall position.

20 Claims, 5 Drawing Sheets

(56) References Cited

U.S. PATENT DOCUMENTS

| | | | | |
|---|---|---|---|---|
| 8,482,401 | B2 | 7/2013 | Morino et al. | |
| 10,610,710 | B2 * | 4/2020 | Huseth | A62B 35/0025 |
| 2010/0326767 | A1 | 12/2010 | Guthrie et al. | |
| 2011/0103558 | A1 * | 5/2011 | Hooten | A62B 35/04 379/37 |
| 2013/0076515 | A1 | 3/2013 | Flynt et al. | |
| 2013/0312168 | A1 | 11/2013 | Raanan | |
| 2015/0027808 | A1 | 1/2015 | Baillargeon et al. | |
| 2015/0265860 | A1 | 9/2015 | Kennedy et al. | |

FOREIGN PATENT DOCUMENTS

| | | | |
|---|---|---|---|
| CN | 202961570 | U | 6/2013 |
| CN | 203311589 | U | 11/2013 |
| CN | 103648590 | A | 3/2014 |
| CN | 203829509 | U | 9/2014 |
| FR | 2755236 | A1 | 4/1998 |
| GB | 2486012 | A | 6/2012 |
| JP | 2005-218725 | A | 8/2005 |

OTHER PUBLICATIONS

Annex to the communication Mailed on Oct. 23, 2020 for European Application No. 16898807.9, 7 pages.
Communication pursuant to Article 94(3) issued in European Application No. 16898807.9, dated Oct. 23, 2020, 2 pages.
Extended European Search Report issued in Application No. 16898807.9 dated Nov. 28, 2019, 8 pages.
International Search Report and Written Opinion issued in International Application No. PCT/US2016/027429, dated Jan. 12, 2017, 12 pages.
Non-Final Rejection dated Apr. 3, 2020 for U.S. Appl. No. 16/093,729.
Notice of Allowance and Fees Due (PTOL-85) dated Jul. 28, 2020 for U.S. Appl. No. 16/093,729.
Office Action Appendix dated Jul. 28, 2020 for U.S. Appl. No. 16/093,729.
Office Action for Chinese Patent Application No. 201680086797.9, dated Apr. 2, 2020, 8 pages.
CN Office Action dated Dec. 22, 2021, including Search Report, for CN Application No. 202110653475, 9 pages.
CN Office Action dated Dec. 30, 2021, including Search Report, for CN Application No. 202110653464, 5 pages.
English Translation of CN Office Action dated Dec. 22, 2021, including Search Report, for CN Application No. 202110653475, 11 pages.
English Translation of CN Office Action dated Dec. 30, 2021, including Search Report, for CN Application No. 202110653464, 8 pages.
Results of Examiner and Applicant Consultation Mailed on Feb. 11, 2022 for EP Application No. 16898807, 3 pages.
Communication Pursuant to Article 94(3) issued in European Application No. 16898807.9 dated Jul. 9, 2021, 9 pages.
CN Office Action dated Jul. 26, 2022 for CN Application No. 202110653464, 3 pages.
Communication about intention to grant a European patent dated Jul. 26, 2022 for EP Application No. 16898807, 6 pages.
Communication about intention to grant a European patent received for European Application No. 16898807.9, dated Jul. 26, 2022, 6 pages.
CN Notice of Allowance dated Aug. 26, 2022 for CN Application No. 202110653475, 2 pages.
English translation of CN Notice of Allowance dated Aug. 26, 2022 for CN Application No. 202110653475, 2 pages.
English Translation of CN Office Action dated Jul. 26, 2022 for CN Application No. 202110653464, 4 pages.
CN Notice of Allowance dated Mar. 30, 2021 for CN Application No. 201680086797.
CN Notice of Allowance dated Nov. 2, 2022 for CN Application No. 202110653464.
English translation of CN Notice of Allowance dated Mar. 30, 2021 for CN Application No. 201680086797.
English Translation of CN Office Action dated Nov. 2, 2022 for CN Application No. 202110653464.
Communication about intention to grant a European patent dated Dec. 23, 2022 for EP Application No. 16898807.9.
Decision to grant a European patent dated May 8, 2023 for EP Application No. 16898807, 2 page(s).
Extended European Search Report dated Jul. 7, 2023 for EP Application No. 23150763, 15 page(s).

* cited by examiner

Fig. 7
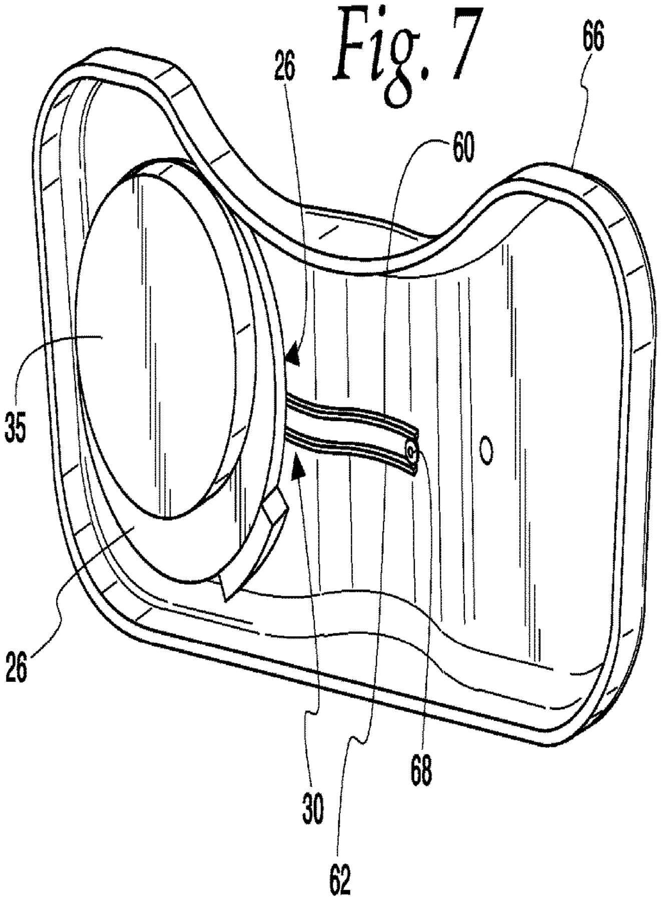
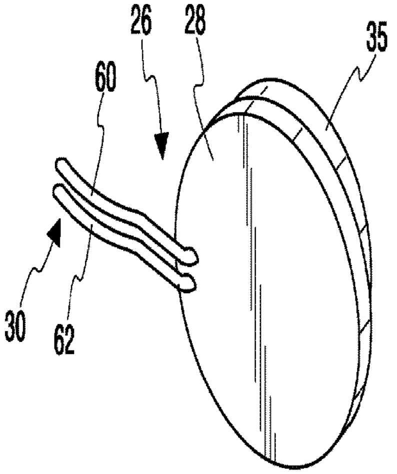
Fig. 8
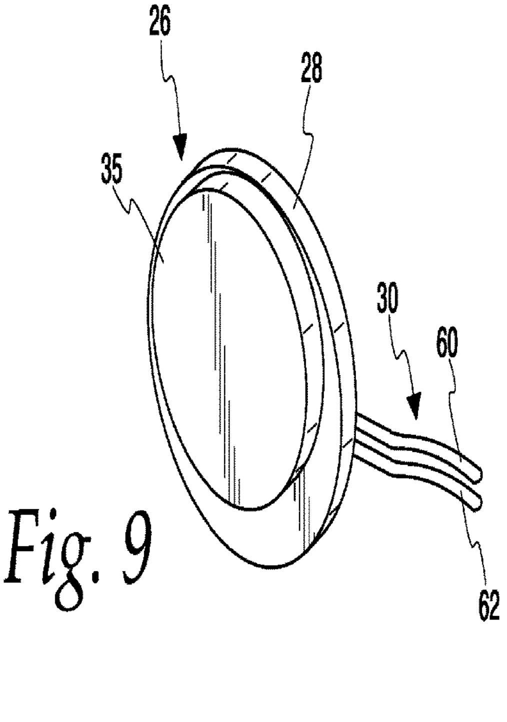
Fig. 9

10
22
40
52
38
48
44
46
24
54
42
36
20

10
22
40
52
24
54
48
50
36
20

10
22
26
35
34
28
70
32
36
20

WEIGHT BEARING FALL PROTECTION CONNECTOR HAVING A WIRELESS FALL INDICATOR

CROSS-REFERENCE TO RELATED APPLICATIONS

This application is a continuation of U.S. Non-Provisional patent application Ser. No. 16/093,729, filed Oct. 15, 2018, entitled "Weight Bearing Fall Protection Connector Having a Wireless Fall Indicator," which claims the benefit of priority to International Application No. PCT/US2016/027429, filed Apr. 14, 2016, the entire disclosures of each of which are hereby incorporated herein by reference in their entireties for all purposes.

FIELD

This invention relates to fall protection systems and equipment, and more particularly, to weight bearing couplings/connectors that are used to connect various pieces of fall protection equipment and to transfer the weight of a worker from one piece of fall protection equipment to another during a fall event.

BACKGROUND

In the fall protection industry, end users understand the importance of fall protection as a means for limiting free fall distances and force during a fall event of a worker. To this end, suitable fall protection equipment has been developed and utilized to help protect a worker during a fall event. In this regard, fall protection systems typically consist of a fall harness worn by the worker and connected to a static line or self-retracting lifeline (SRL). Together such systems provide a reliable restraint system worn by the worker that is connected to a fixed anchor point on a supporting structure. Such fall protection systems are designed to arrest the fall of a worker quickly and safely, but result in the worker being suspended in the fall harness. If there is no ladder or scaffolding for the worker to climb back up, the worker will remain suspended until additional rescue help can be rendered. Being suspended in the fall harness for a period of time can lead to serious injury or death. Consequently, rapid response is critical. Thus, there is a need to provide an alert to others that a fall event has occurred so that they can come to the aid of a worker suspended by the fall protection equipment.

When a fall occurs, the fall harness and safety/lifeline are designed to absorb the impact of the fall, which typically results in damage to the fall protection equipment. Various indicators are used on fall harnesses, fall lanyards and SRL's to indicate this damage. Additionally, the coupling/connector used between the fall harness and the static safety line, fall lanyard, or SRL often includes a visual fall indicator. One such fall indicator consists of a sliding bar that is held in place with a metal pin. When a fall occurs, the sliding bar will sever the metal pin and move to position where a red fall indicator on the bar is exposed.

SUMMARY

In accordance with one feature of this disclosure, a weight bearing, fall protection connector is provided for connecting one piece of fall protection equipment to another piece of fall protection equipment to transfer the weight of the worker in the event of a fall. The connector includes a first connection member configured to attach the connector to one piece of fall protection equipment, and a second connection member configured to attach the connector to another piece of fall protection equipment. The first and second connection members are fixed to each other to transfer the weight of a worker in a fall event and for movement relative to each other between a ready position where the connector has not experienced a fall event while connected to a worker and a fall position where the connector has experienced a fall event while connected to a worker. A breakable component is operably connected to the first and second connection members, and has a retaining condition wherein the breakable component maintains the connection members in the ready position and a broken condition wherein the breakable component allows the connection members to move to their fall position after the breakable component has been broken by a weight transfer from a fall event. A wireless fall indicator includes a wireless transmitter and a switch. The switch is configured to activate the wireless transmitter in response to movement of the connection members from the ready position to the fall position. The wireless transmitter is configured to transmit a wireless signal indicating that a worker has fallen when the wireless transmitter is activated by the switch.

As one feature, the first connection member includes a first connection portion to attach the first connection member to one piece of fall protection equipment. The second connection member includes a second connection portion to attach the second connection member to another piece of fall protection equipment. Each of the connection members has a weight transfer portion engaged with the weight transfer portion of the other connection member to transfer the weight of a worker from the first connection member to the second connection member during a fall event.

In one feature, the weight transfer portions are engaged to each other for guided translation relative to each other as the connection members move from the ready position to the fall position, and each of the weight transfer portions has a stop surface that engages another surface to retain the connection members in the fall position.

According to one feature, one of the weight transfer portions includes a bar and the other of the weight transfer portions includes an opening that receives the bar for sliding movement of the bar in the opening.

As one feature, the bar is a cylindrical shaft and the opening is a cylindrical bore that allow the connection members to swivel relative to each other in the ready position.

In one feature, at least one of the weight transfer portions includes a collar that engages the other weight transfer portion to retain the connection members in the fall position.

According to one feature, the breakable component is a shear pin that shears in response to a fall event.

As one feature, the shear pin is received in closely conforming bores formed in the connection members.

In one feature, the shear pin retains a collar in a fixed position relative to one of the connection members with connection members in the ready position, and the one of the connection members is released by the shear pin for movement relative to the collar in response to a fall event.

According to one feature, the switch includes a pair of electrical contacts that are spaced from each other with the connection members in the ready position and pressed against each other with the connection members in the fall position.

As one feature, the first connection member includes a surface that engages one of the pair of electrical contacts as the connection members move from the ready position to the fall position. The second connection member includes a surface that engages the other of the pair of electrical contacts as the connection members move from ready position to the fall position, the engagement of the surfaces with the electrical contacts pressing the contacts against each other with the connection members in the fall position.

In one feature, at least one of the connection members is configured to generate a magnetic field, and the switch is a magnetic reed switch that is actuated in response to movement of the magnetic field as the connection members move from the ready position to the fall position.

According to one feature, the connector is a D-ring connector.

As one feature, the connector is a Snap Hook connector.

In accordance with another feature of this disclosure, a weight bearing fall protection connector is provided for connecting one piece of fall protection equipment to another piece of fall protection equipment to transfer the weight of the worker in the event of a fall. The connector includes a first connection member including a first connection portion configured to attach the first connection member to one piece of fall protection equipment, and a second connection member including a second connection portion configured to attach the connector to another piece of fall protection equipment. The first and second connection members are fixed to each other to transfer the weight of a worker in a fall event and for movement relative to each other between a ready position where the connector has not experienced a fall event while connected to a worker and a fall position where the connector has experienced a fall event while connected to a worker. A breakable component is operably connected to the first and second connection members and has a retaining condition wherein the breakable component maintains the connection members in the ready position and a broken condition wherein the breakable component allows the connection members to move to their fall position after the breakable component has been broken by a weight transfer from a fall event. A wireless fall indicator includes a wireless transmitter and a switch. The switch is configured to activate the wireless transmitter in response to movement of the connection members from the ready position to the fall position, the wireless transmitter configured to transmit a wireless signal indicating that a worker has fallen when the wireless transmitter is activated by the switch. Each of the connection members includes a weight transfer portion engaged with the weight transfer portion of the other connection member to transfer the weight of a worker from the first connection member to the second connection member during a fall event. Each of the weight transfer portions includes a stop surface that engages another surface to retain the connection members in the fall position. One of the weight transfer portions includes a cylindrical shaft and the other of the weight transfer portions includes a cylindrical bore that receives the bar for sliding movement of the shaft in the bore and for rotational movement of the shaft in the bore. The breakable component is a shear pin that shears in response to a fall event. The shear pin is received in closely conforming bores formed in the weight transfer portions. The switch includes one of: a magnetic reed switch that is actuated in response to movement of the connection members from the ready position to the fall position; or a pair of electrical contacts that are spaced from each other with the connection members in the ready position and pressed against each other by the stop surfaces with the connection members in the fall position.

This disclosure suggests the use of an electronic module that detects the breaking of a metal pin, and generation of a wireless signal (RF signal) indicating that a fall has occurred. This enables the fall protection system to automatically and immediately notify responsible persons of the fall event. This reduces the response time and the time the person is suspended in the fall equipment.

It should be appreciated that a connector according to this disclosure may include only some of the above features, only one of the above features, and/or any combination of the above features.

Other features and advantages will become apparent from a review of the entire specification, including the appended claims and drawings.

BRIEF DESCRIPTION OF THE DRAWINGS

FIGS. 7-9 are isometric views of a fall alarm/indicator component of the connector of FIG. 6, with FIG. 7 also including a housing for the fall alarm/indicator component;

DETAILED DESCRIPTION

Figures 10, 11, 12:
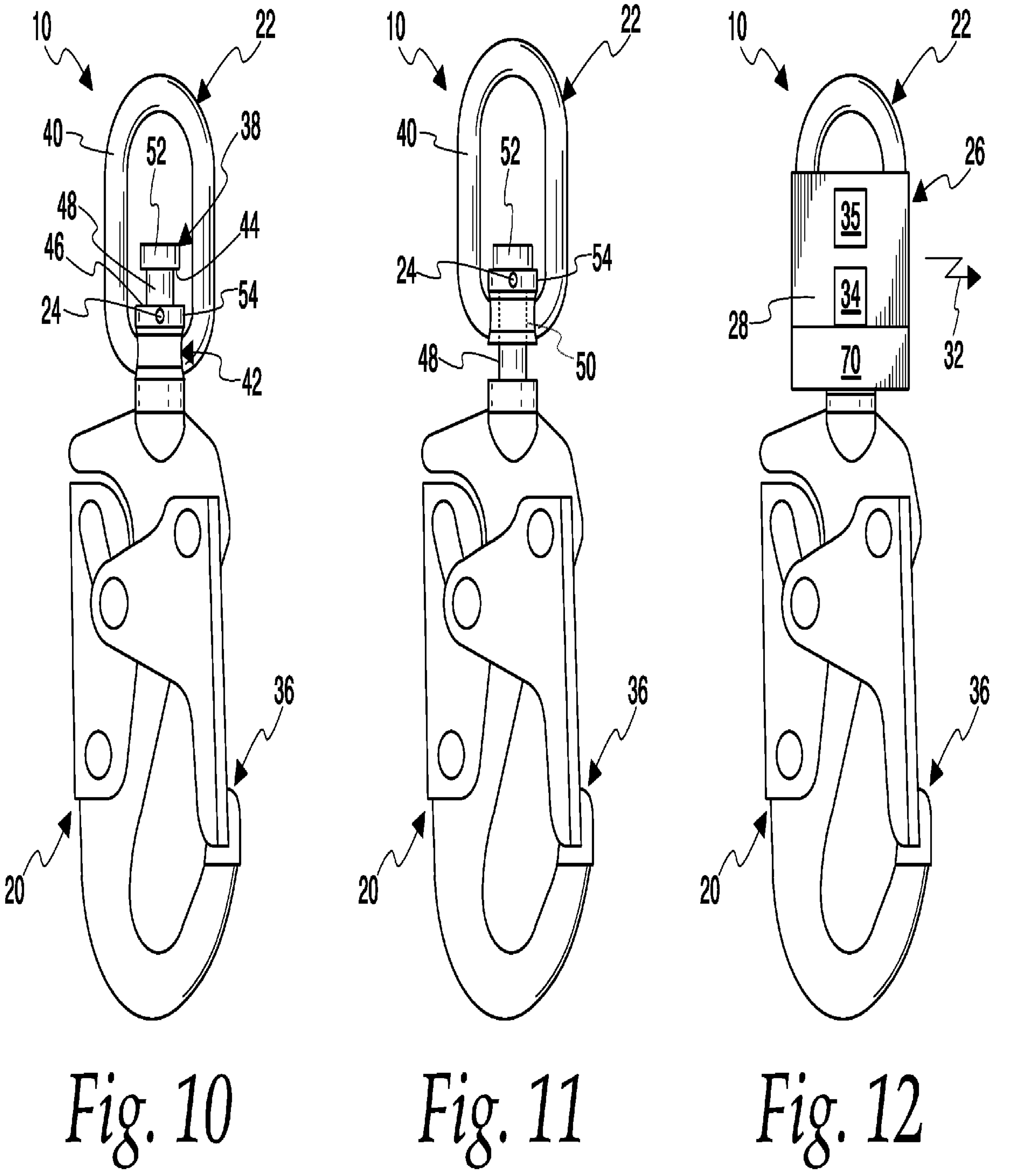
FIG. 10 is an elevation view of another embodiment of the coupling/connector according to this disclosure, with the connector shown in the "ready" condition and with a fall alarm/indicator component removed for purposes of illustration.
FIG. 11 is a view similar to FIG. 10 but showing the connector of FIG. 10 in the "fall" condition.
FIG. 12 is a view of the connector embodiment of FIGS. 10 and 11 with the fall alarm/indicator component shown diagrammatically.

A weight bearing fall protection coupling/connector 10 is provided for connecting one piece of fall protection equipment to another piece of fall protection equipment to transfer the weight of the worker in the event of a fall, with FIGS. 1-9 showing an embodiment of the connector 10 in the form of a swivel D-ring and FIGS. 10-12 showing an embodiment of the connector 10 in the form of a swivel Snap Hook. The connector 10 can be used with any type of fall protection equipment that is used to protect a worker during a fall event, including, for example, fall harnesses, static lines, fall lanyards, self-retracting lifelines, rope grab systems, and anchorage rescue devices. Typically, the connector 10 will be utilized to connect a fall harness worn by a worker to some other piece of fall protection equipment, such as a self-retracting lifeline or fall lanyard, so as to transfer the weight/load of a worker during a fall event.

The connector 10 includes a first connection member 20 configured to attach the connector 10 to one piece of fall protection equipment, such as a harness worn by a worker, and a second connection member 22 configured to attach the connector 10 to another piece of fall protection equipment, such as a self-retracting lifeline. The first and second connection members 20 and 22 are fixed to each other to transfer the weight of a worker in a fall event and for movement relative to each other between a "ready" position (shown in FIGS. 1, 3-5, 6A and 10) wherein the connector 10 has not experienced a fall event while connected to a worker and a "fall" position (shown in FIGS. 2, 6B and 11) where the connector 10 has experienced a fall event while connected to a worker. The connector 10 further includes a breakable component 24 operably connected to the first and second connection members 20 and 22 and having a retaining condition wherein the breakable component 24 maintains the connection members 20 and 22 in the ready position and a broken condition wherein the breakable component 24 allows the connection members 20 and 22 to move to their fall position after the breakable component 24 has been broken by a weight transfer from a fall event. The connector 10 further includes a wireless fall alarm/indicator 26, with the fall indicator 26 including a wireless transmitter 28 and a switch 30 configured to activate the wireless transmitter 28 in response to movement of the connection members 20 and 22 from the ready position to the fall position. The wireless transmitter 28 is configured to transmit a wireless signal, shown generally at 32, indicating that a worker has fallen when the wireless transmitter 28 is activated by the switch 30. In this regard, the wireless transmitter 28 will include circuitry, shown generally at 34, that is either activated by or responsive to the switch 30 so as to operate the wireless transmitter 28 to transmit the wireless signal 32. The wireless signal 32 can be created and transmitted according to any suitable wireless protocol, many of which are known, including any suitable Wi-Fi, Bluetooth or RF protocol. The fall indicator 26 can further include a battery 35 to power the wireless transmitter 28 and switch 30, as required. Depending on the particular application, the battery may be replaceable or may be suitable for the life of the connector 10. The wireless signal 32 is transmitted to other suitable wireless devices, such as, for example, cellular phones, smart phones, and/or other wireless receivers, carried by other workers and/or rescue personnel who can then be alerted by the other suitable devices that a fall event has occurred. In this regard, the wireless signal 32 will be transmitted continuously by the wireless transmitter 28 until steps are taken to deactivate the wireless signal 32 after the worker that experienced the fall event has been rescued.

The first connection member 20 includes a first connection portion 36 to attach the first connection member 20 to one piece of fall protection equipment, such as a harness worn by a worker, and a weight transfer portion 38 to transfer the weight of a worker to the second connection member 22. In the embodiment of the connector 10 shown in FIGS. 1-6, the first connection portion 36 is a rectangular loop that is configured to receive a length of webbing or strap and is commonly used to connect with the webbing/strapping of a harness worn by a worker. In the embodiment of the connector 10 shown in FIGS. 10-12, the first connection portion 36 is as shown in the form of a snap hook component that will typically be used to connect to a D-ring on a harness or to an anchor point on a structure. The second connection member 22 includes a second connection portion 40 to attach the second connection member to another piece of fall protection equipment, such as a fall lanyard, and a weight transfer portion 42 engaged with the weight transfer portion 38 of the first connection member 20 to transfer the weight of the worker from the first connection member 20 to the second connection member 22 during a fall event. In the embodiment of the connector 10 shown in FIGS. 1-6, the second connection portion 40 is shown in the form of a circular loop that will typically be connected to a snap hook component of a static line, a safety lanyard, or an SRL. In the embodiment of the connector shown in FIGS. 10-12, the second connection portion 40 is shown in the form of a somewhat oval-shaped loop that will typically receive a rope/cable/line of another of a piece of fall protection equipment.

The weight transfer portions 38 and 42 are engaged to each other for guided translation relative to each other as the connection members 20 and 22 move from the ready position to the fall position. Each of the weight transfer members 38 and 42 includes a stop surface (44 and 46, respectively) that engages another surface (the other stop surface in the illustrated embodiments) to retain the connection members 20 and 22 in the fall position. In the illustrated embodiments, the weight transfer portion 38 includes a bar 48 shown in the specific form of a cylindrical shaft 48, and the weight transfer portion 42 includes an opening 50 shown in the specific configuration of a cylindrical bore 50 that receives the shaft 48 for sliding and rotational movement of the shaft 48 in the bore 50. In this regard, while the connection members 20 and 22 are free to swivel relative to each other in both the ready and fall conditions, the breakable component 24 prevents the shaft 48 from sliding in the bore 50 until the breakable component 24 is broken by the weight transfer of the worker during a fall event. In the illustrated embodiments, the weight transfer portion 38 includes a collar 52 that defines the stop surface 44 and the weight transfer portion 42 includes a collar 54 that defines the stop surface 46.

The connection members 20 and 22 can be made of any suitable material and will be typically made from a high strength metal, such as a high strength steel or high strength stainless steel.

In the illustrated embodiments, the breakable component 24 is a shear pin 24 that shears in response to a fall event. The shear pin 24 is received in closely conforming bores 56 and 58 in the connection members 20 and 22. More specifically, in the illustrated embodiments, the shear pin 24 is received in a bore 56 formed in the shaft 48 and in a pair of spaced bores 58 that are formed in the collar 54 of the weight transfer portion 42. Thus, it can be seen that the shear pin 24 retains the collar 54 in a fixed position relative to the shaft 48 in the ready position as shown in FIG. 6A, and that the shaft 48 and connection member 20 are released by the shear pin 24 for movement relative to the collar 54 and the connection member 32 in response to a fall event, as shown in FIG. 6B.

Figure 1:
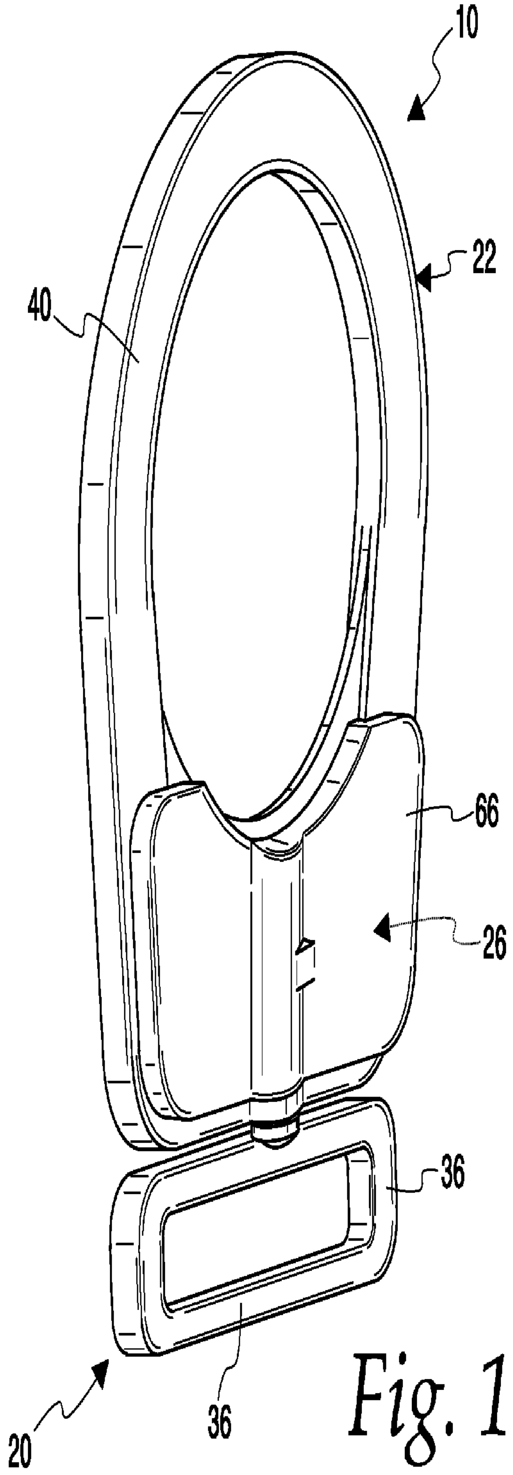
FIG. 1 is an isometric view of one embodiment of a coupling/connector according to this disclosure, shown in a "ready" condition.
Figure 2:
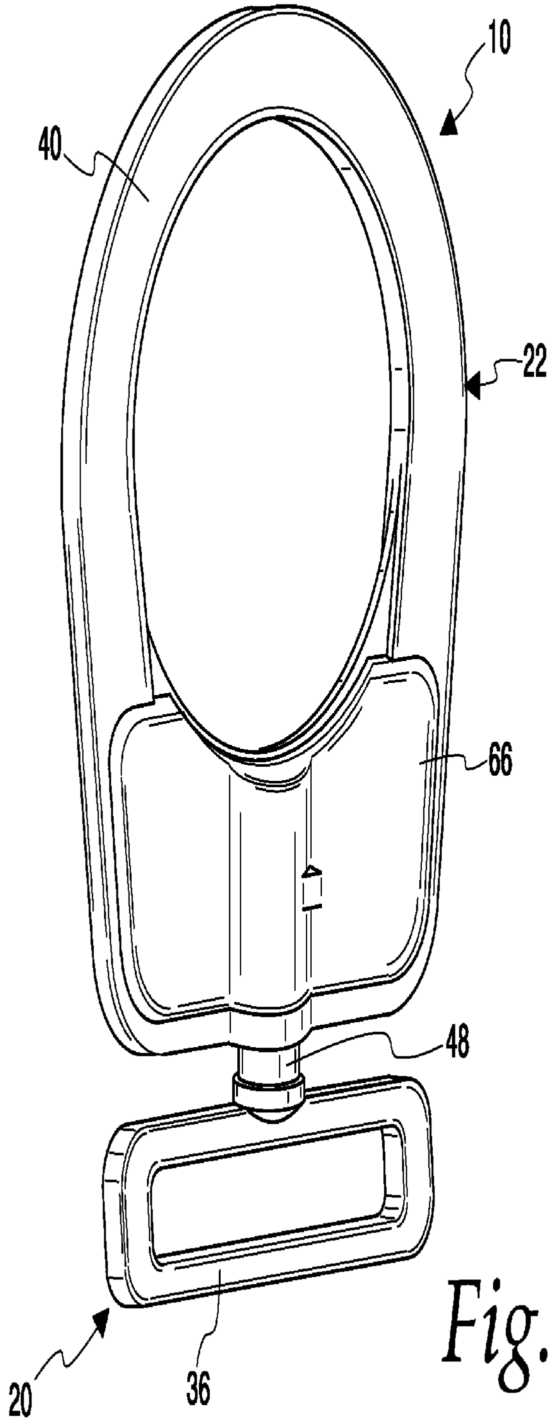
FIG. 2 is another isometric view from a slightly different angle showing the connector of FIG. 1 in a "fall" condition.
Figure 4:
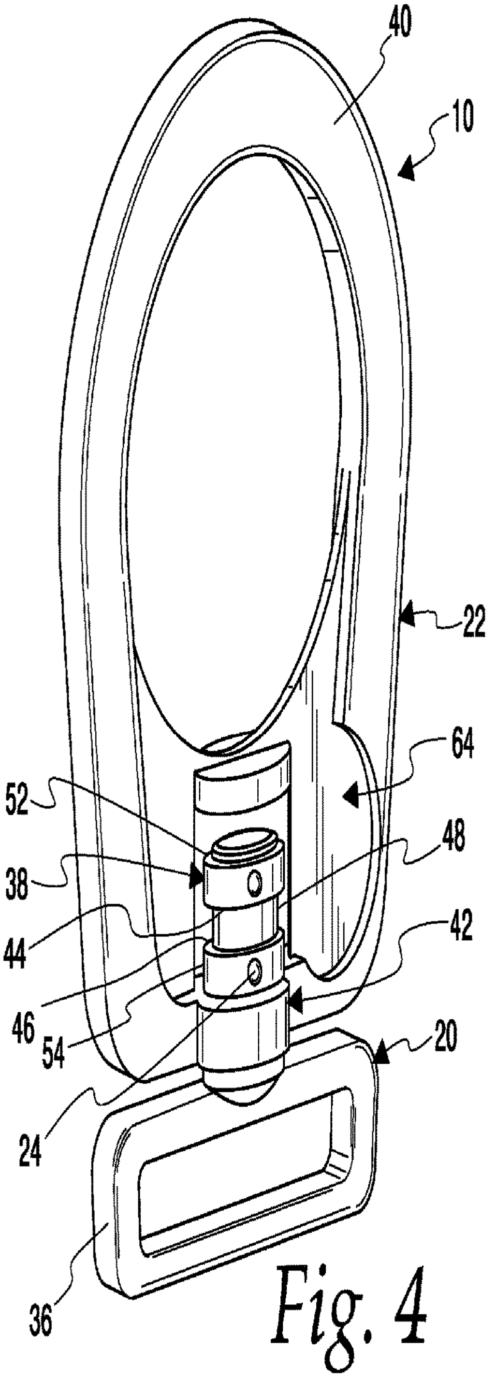
FIG. 4 is an isometric view of the connector of FIGS. 1-3 showing the housing component and a fall alarm/indicator component removed for purposes of illustration.
Figure 3:
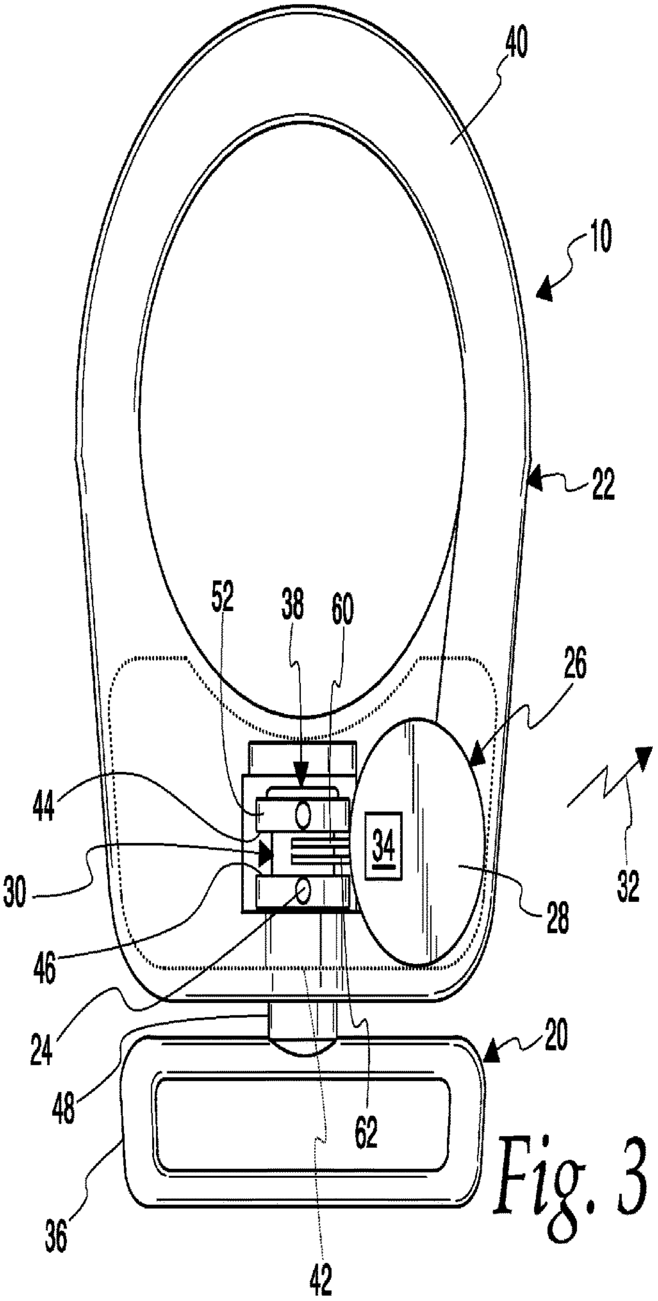
FIG. 3 is a front elevational view of the connector of FIGS. 1 and 2, with a housing component shown in phantom for purposes of illustration.
Figure 6A:
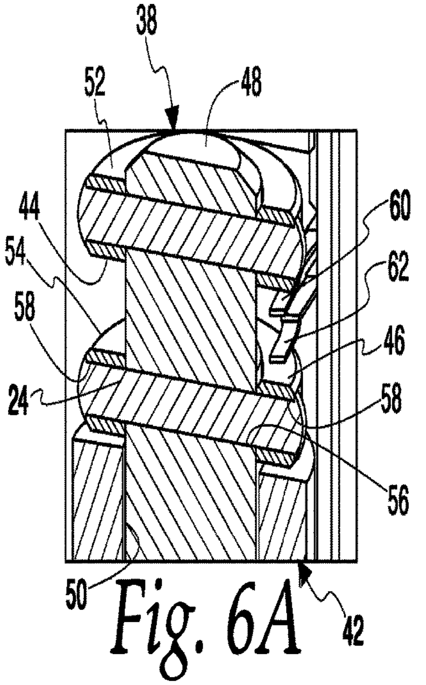
FIGS. 6A and 6B are enlarged views of selected components of the connector of FIGS. 1-5, with FIG. 6A showing the connector in the ready condition and FIG. 6B showing the connector in the "fall" condition.
Figure 6B:
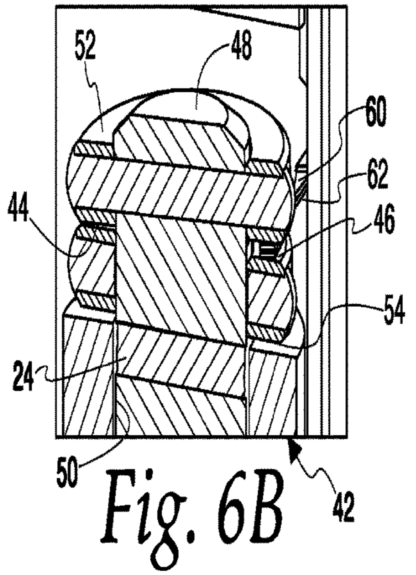
Figure 5:
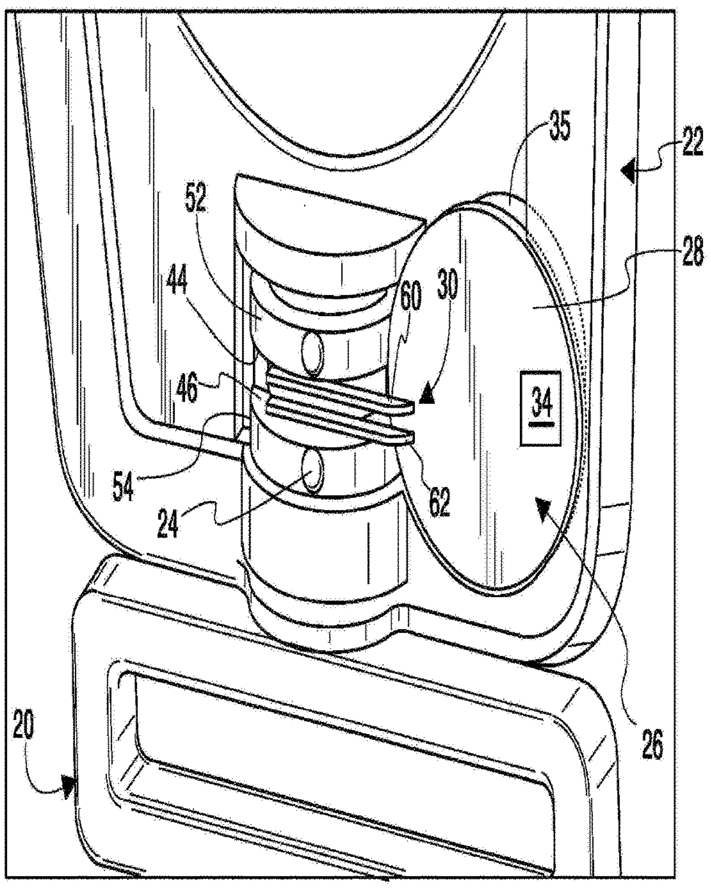
FIG. 5 is an enlarged isometric view of a portion of the connector of FIGS. 1-4, again with the housing component removed for purposes of illustration.

With reference to the embodiment of the connector shown in FIGS. 1-9, the switch 30 includes a pair of electrical contacts 60 and 62 that are spaced from each other with the connection members 20 and 24 in the ready position, as best seen in FIGS. 3, 5 and 6A, and that are pressed against each other with the connection members 20 and 22 in the fall position, as best seen in FIG. 6B. In this regard in the illustrated embodiment, the stop surface 44 of the first connection member 20 engages the electrical contact 60 and the stop surface 46 of the second connection member 22 engages the other electrical contact 62 as the connection members 20 and 22 move from the ready position to the fall position, with the engagement of the surfaces 44 and 46 with the electrical contacts 60 and 62 pressing the contacts 60 and 62 against each other with the connection members 20 and 24 in the fall position. A circuit is closed by the contacts 60 and 62 when they are pressed against each other which serves to activate the wireless transmitter 28 to send the wireless signal 32.

In the embodiment of the connector 10 shown in FIGS. 1-6, the second connection portion 22 includes a relieved area 64 for receiving the fall indicator 26, which is mounted in a housing 66 that can be attached to the connection portion 22 using any suitable means, such as, for example, snap fit connections or permanent bonding. Ideally, the wireless transmitter 28 and associated circuitry 35 are enclosed in a sealed chamber that is IP68 and IP69K rated, with the two contacts 60 and 62 protruding from the sealed chamber. In the illustrated embodiment, the housing 66 includes a post 68 that extends between the tips of the contacts 60 and 62 to maintain their spaced relationship until the connector 10 experiences a fall event.

In the embodiment of the conductor 10 shown in FIGS. 10 and 11, the switch 30 is provided in the form of a magnetic reed switch, shown diagrammatically at 70, that is actuated in response to the movement of a magnetic field as connection members 20 and 22 move from the ready position to the fall position. In this regard, at least one of the connection members 20 and 22 or the breakable component 24 is configured to generate a magnetic field that will actuate the magnetic reed switch 70, and, in the illustrated embodiment, the shear pin 24 is magnetized to generate a magnetic field that moves with the connection member 20 as the connection members 20 and 24 move from the ready position to the fall position and serves to actuated the magnetic reed switch 70. The circuitry 35 is triggered or senses the actuation of the magnetic reed switch 70 and activates the wireless transmitter 28 to send the wireless signal 32.

It should be appreciated that while specific embodiments have been shown herein that will prove advantageous for a number of applications, this disclosure anticipates other embodiments of couplings/connectors 10 that will utilize the concepts disclosed herein and that no limitations to specific geometric configurations or specific configurations of the components are intended unless expressly recited in an appended claim. In this regard, for example, while the breakable component 24 has been shown in the form of a shear pin 24, in some applications it may be desirable to utilize other types of breakable components. As another example, while specific geometries have been shown for the connection portions 36 and 40, other geometric shapes and configurations may be desirable depending upon the details of the specific application. As yet a further example, while the weight transfer portion 38 has been shown in the form of a shaft 48 that is received in a bore 50, other geometric shapes and other configurations may be desirable depending upon the specifics of a particular application.

It should be appreciated that the connector 10 disclosed herein provides a simple and reliable structure for alerting workers and emergency personnel remote from a fall event that a worker has experienced a fall event and is suspended. In this regard, it should be appreciated that the embodiment of the connector 10 disclosed herein utilize structure that has already been successfully employed in the industry, with proven reliability and simplicity, with a minimum amount of modification to this structure.

What is claimed is:

1. A weight bearing fall protection connector for connecting one piece of fall protection equipment to another piece of fall protection equipment to transfer the weight of a worker in an event of a fall, the connector comprising:

a first connection member configured to attach the connector to one piece of fall protection equipment;

a second connection member configured to attach the connector to another piece of fall protection equipment, the first and second connection members rotatably fixed to each other and configured to transfer the weight of a worker in a fall event and for movement relative to each other between a ready position where the connector has not experienced a fall event while connected to a worker and a fall position where the connector has experienced a fall event while connected to a worker;

a breakable component operably connected to the first and second connection members and having a retaining condition wherein the breakable component maintains the connection members in the ready position and a broken condition wherein the breakable component allows the connection members to move to their fall position after the breakable component has been broken by a weight transfer from a fall event; and a wireless fall indicator comprising:

a wireless transmitter, and a switch configured to activate the wireless transmitter in response to movement of the connection members from the ready position to the fall position, the wireless transmitter configured to transmit a wireless signal indicating that a worker has fallen when the wireless transmitter is activated by the switch.

2. The weight bearing fall protection connector of claim 1, wherein:

the first connection member comprises a first connection portion configured to attach the first connection member to one piece of fall protection equipment, the second connection member comprises a second connection portion configured to attach the second connection member to another piece of fall protection equipment, and each of the connection members defines or comprises a weight transfer portion rotatably engaged with the weight transfer portion of the other connection member to transfer the weight of a worker from the first connection member to the second connection member during or in response to the fall event.

3. The weight bearing fall protection connector of claim 2, wherein the weight transfer portions are rotatably engaged to each other for guided translation relative to each other as the connection members move from the ready position to the fall position, and each of the weight transfer portions has a stop surface that engages another surface to retain the connection members in the fall position.

4. The weight bearing fall protection connector of claim 2, wherein one of the weight transfer portions comprises a bar and the other of the weight transfer portions comprises an opening that receives the bar for sliding movement of the bar in the opening.

5. The weight bearing fall protection connector of claim 4, wherein the bar is a cylindrical shaft and the opening is a cylindrical bore that allow the connection members to swivel relative to each other in the ready position.

6. The weight bearing fall protection connector of claim 2, wherein at least one of the weight transfer portions comprises a collar that engages the other weight transfer portion to retain the connection members in the fall position.

7. The weight bearing fall protection connector of claim 1, wherein the breakable component comprises a shear pin that is configured to shear during or in response to the fall event.

8. The weight bearing fall protection connector of claim 7, wherein the shear pin is received in closely conforming bores formed in the connection members.

9. The weight bearing fall protection connector of claim 7, wherein the shear pin retains a collar in a fixed position relative to one of the connection members with connection members in the ready position, and wherein the one of the connection members is released by the shear pin for movement relative to the collar in response to a fall event.

10. The weight bearing fall protection connector of claim 1, wherein the switch comprises a pair of electrical contacts that are spaced from each other with the connection members in the ready position and pressed against each other with the connection members in the fall position.

11. The weight bearing fall protection connector of claim 10, wherein:

the first connection member includes a surface that engages one of the pair of electrical contacts as the connection members move from the ready position to the fall position; and the second connection member includes a surface that engages the other of the pair of electrical contacts as the connection members move from ready position to the fall position, the engagement of the surfaces with the electrical contacts pressing the contacts against each other with the connection members in the fall position.

12. The weight bearing fall protection connector of claim 1, wherein at least one of the connection members or the breakable component is configured to generate a magnetic field, and the switch is a magnetic reed switch that is actuated in response to movement of the magnetic field as the connection members move from the ready position to the fall position.

13. The weight bearing fall protection connector of claim 1, wherein the connector is a D-ring connector.

14. The weight bearing fall protection connector of claim 1, wherein the connector is a snap hook connector.

15. A weight bearing fall protection connector comprising:

a first connection member configured to be coupled to a first piece of fall protection equipment;

a second connection member configured to be coupled to a second piece of fall protection equipment, the first and second connection members being rotatably fixed to each other, wherein the first connection member is configured for movement relative to the second connection member to transfer the weight of a worker in a fall event between a ready position when the fall event has not occurred and a fall position in an instance in which the first connection member is coupled to the first piece of fall protection equipment, the second connection member is coupled to the second piece of fall protection equipment, one of the first or second pieces of fall protection equipment are properly worn by the worker, and the fall event has occurred;

a breakable component operably connected to the first connection member and having a retaining condition wherein the breakable component maintains the first connection member in the ready position and a broken condition wherein the breakable component allows the first connection member to move to the fall position after the breakable component has been broken by a weight transfer from a fall event; and a wireless fall indicator comprising:

a wireless transmitter, and a switch configured to activate the wireless transmitter in response to movement of the first connection member from the ready position to the fall position, the wireless transmitter configured to transmit a wireless signal indicating that the worker has fallen when the wireless transmitter is activated by the switch.

16. The weight bearing fall protection connector of claim 15, wherein the switch comprises a pair of electrical contacts that are configured to be spaced a distance from each other when the first connection member is in the ready position and configured to be disposed against or nearby each other when the first connection member is in the fall position.

17. The weight bearing fall protection connector of claim 16, wherein the first connection member defines or comprises a surface that engages one of the pair of electrical contacts as the first connection member moves from the ready position to the fall position, wherein the second connection member defines or comprises a surface that engages another of the pair of electrical contacts as the first connection member moves from ready position to the fall position, and wherein movement of the first connection member from the ready position to the fall position causes engagement of the surfaces with the electrical contacts pressing the contacts against each other.

18. The weight bearing fall protection connector of claim 15, wherein at least one of the connection members or the breakable component is configured to generate a magnetic field, and the switch is a magnetic reed switch that is actuated in response to movement of the magnetic field as the connection members move from the ready position to the fall position.

19. A weight bearing fall protection connector for connecting one piece of fall protection equipment to another piece of fall protection equipment to transfer the weight of a worker in an event of a fall, the connector comprising:

a first connection member including a first connection portion configured to attach the first connection member to one piece of fall protection equipment;

a second connection member including a second connection portion configured to attach the weight bearing fall protection connector to another piece of fall protection equipment, the first and second connection members rotatably fixed to each other and configured to transfer the weight of a worker in a fall event and for movement relative to each other between a ready position where the weight bearing fall protection connector has not experienced a fall event while connected to a worker and a fall position where the weight bearing fall protection connector has experienced a fall event while connected to a worker;

a breakable component operably connected to the first and second connection members and having a retaining condition wherein the breakable component maintains the connection members in the ready position and a broken condition wherein the breakable component allows the connection members to move to their fall position after the breakable component has been broken by a weight transfer from a fall event; and a wireless fall indicator comprising:

a wireless transmitter, and a switch configured to activate the wireless transmitter in response to movement of the connection members from the ready position to the fall position, the wireless transmitter configured to transmit a wireless signal indicating that a worker has fallen when the wireless transmitter is activated by the switch, wherein the switch includes one of:

a magnetic reed switch that is actuated in response to movement of the connection members from the ready position to the fall position, or a pair of electrical contacts that are spaced from each other with the connection members in the ready position and pressed against each other by the stop surfaces with the connection members in the fall position.

20. The weight bearing fall protection connector of claim 19, wherein the weight bearing fall protection connector comprises one of: a D-ring connector, a carabiner, a snap hook connector, a snap ring, an anchor ring, a spring catch, a swivel shackle, or a swiveling snaphook.

* * * * *